United States Patent [19]

Januel et al.

[11] Patent Number: 5,284,266
[45] Date of Patent: Feb. 8, 1994

[54] STRUCTURE SUCH AS A CONTAINER OR MOBILE SHELTER

[75] Inventors: Bernard Januel, Saint Etienne; Michel Ravilly, Rennes, both of France

[73] Assignee: Marrel and GIAT Industries, France

[21] Appl. No.: 829,075

[22] PCT Filed: Jun. 11, 1991

[86] PCT No.: PCT/FR91/00461
§ 371 Date: Feb. 6, 1992
§ 102(e) Date: Feb. 6, 1992

[87] PCT Pub. No.: WO91/19654
PCT Pub. Date: Dec. 26, 1991

[30] Foreign Application Priority Data
Jun. 11, 1990 [FR] France .................. 90 07237

[51] Int. Cl.⁵ .............................................. B65D 90/14
[52] U.S. Cl. ..................................... 220/1.5; 294/68.1; 414/498; 108/56.1
[58] Field of Search ............. 220/1.5; 294/68.1, 68.26; 414/498, 499, 500

[56] References Cited

U.S. PATENT DOCUMENTS

| | | |
|---|---|---|
| 1,990,118 | 2/1935 | Ellis . |
| 2,781,936 | 2/1957 | Bitney ................... 108/56.1 X |
| 3,743,125 | 7/1973 | Ashley, Jr. ................... 414/498 |
| 4,911,318 | 3/1990 | Bishop . |
| 4,983,089 | 1/1991 | Rose ................... 220/1.5 |
| 5,169,194 | 12/1992 | Yamashita et al. ............ 414/498 |

FOREIGN PATENT DOCUMENTS

| | | |
|---|---|---|
| 1000641 | 2/1952 | France . |
| 1572733 | 7/1969 | France . |
| 2109109 | 5/1972 | France . |
| 2358352 | 2/1978 | France . |

Primary Examiner—Joseph Man-Fu Moy
Attorney, Agent, or Firm—Remy J. VanOphem

[57] ABSTRACT

A structure adapted to be loaded onto a vehicle provided with a hydraulic lifting arm type handling mechanism including two longitudinal bottom rails adapted to cooperate with guide rollers at the rear of the vehicle, and means for moving the rails between a deployed position, in which the rails cooperate with the guide rollers, and a retracted position, in which each rail is withdrawn into a housing in the bottom of the structure.

17 Claims, 12 Drawing Sheets

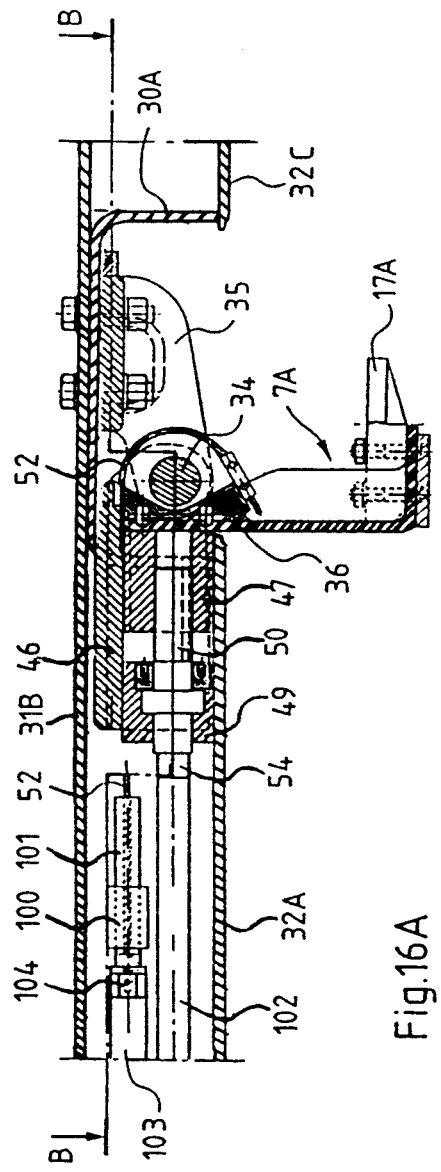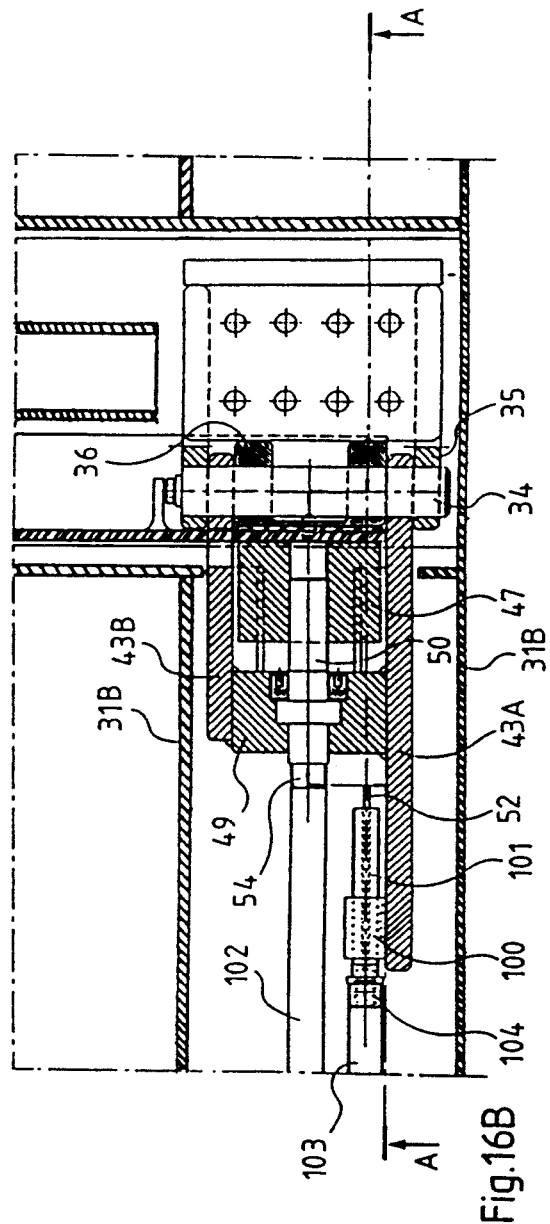
Fig.16A
Fig.16B

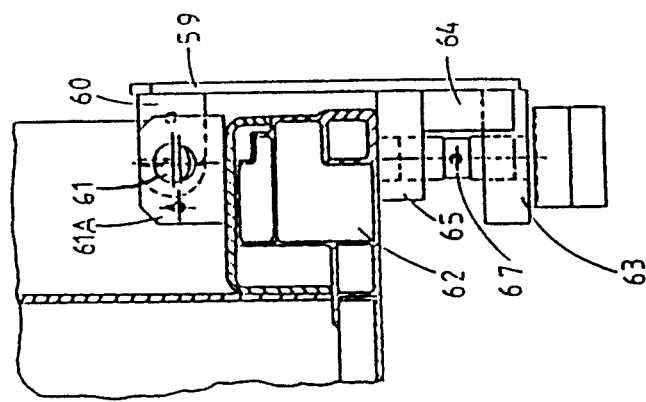
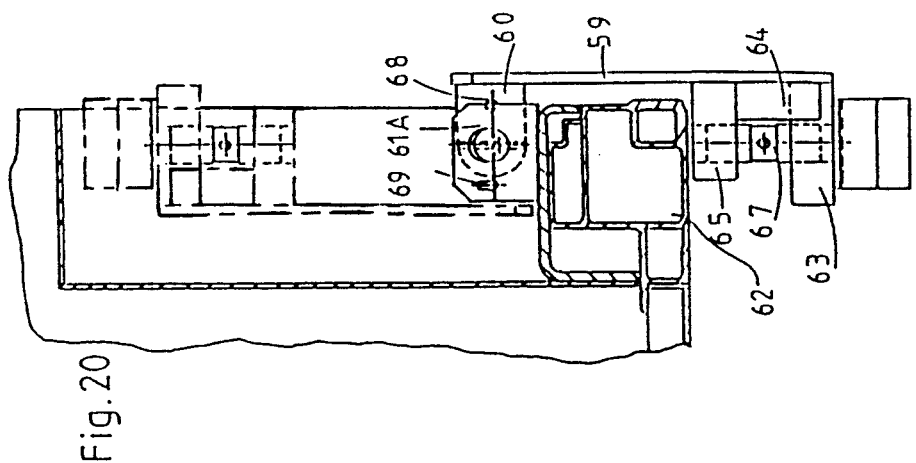
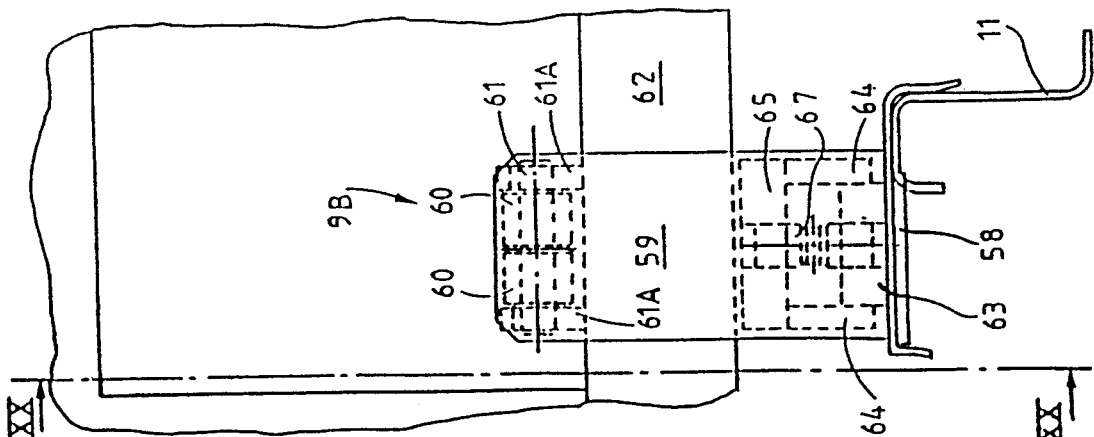

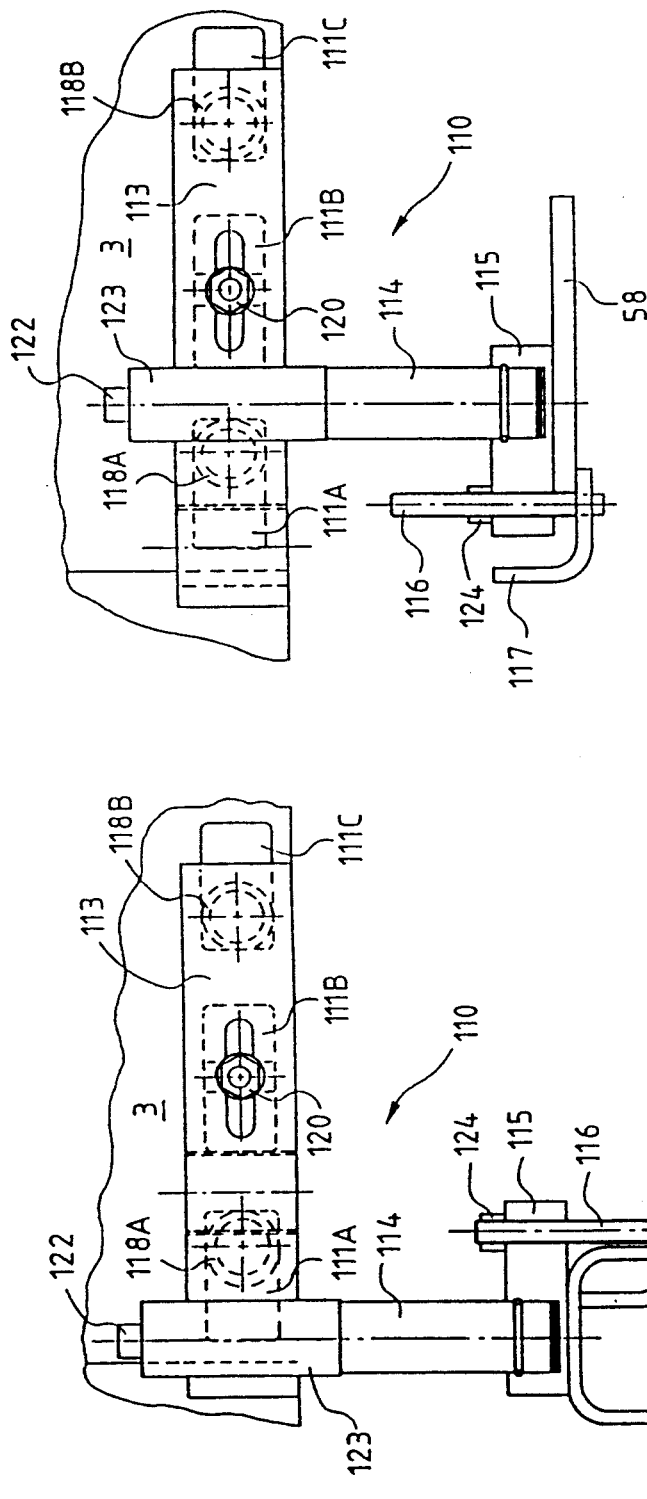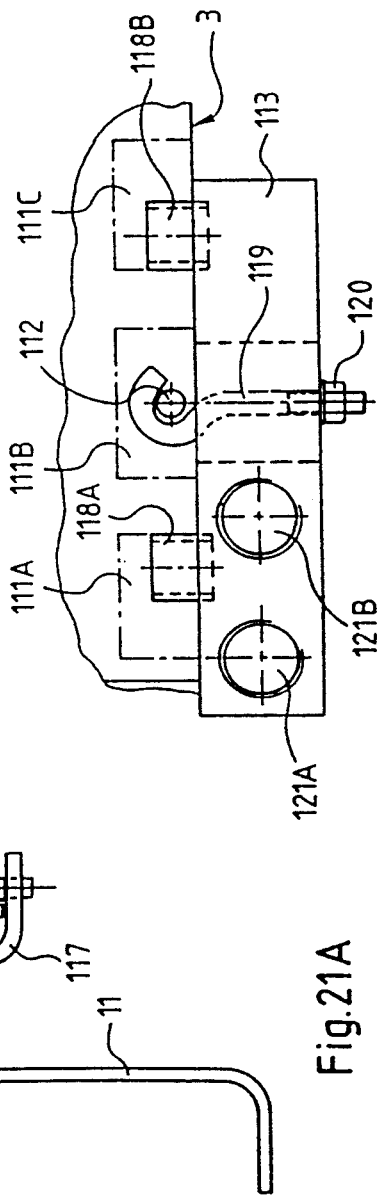

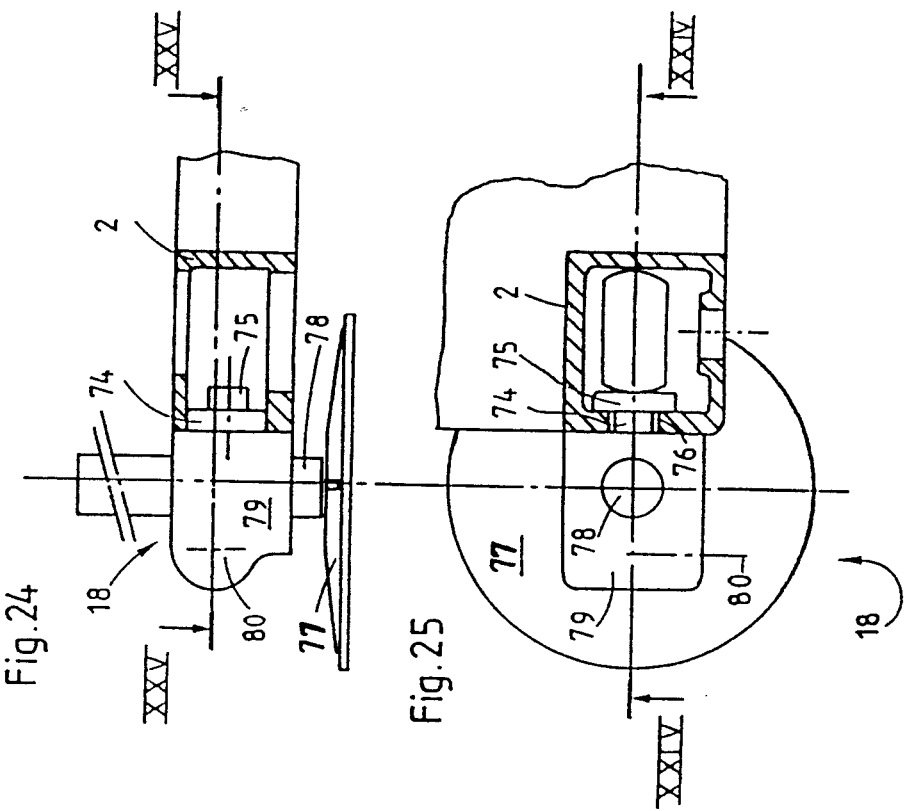
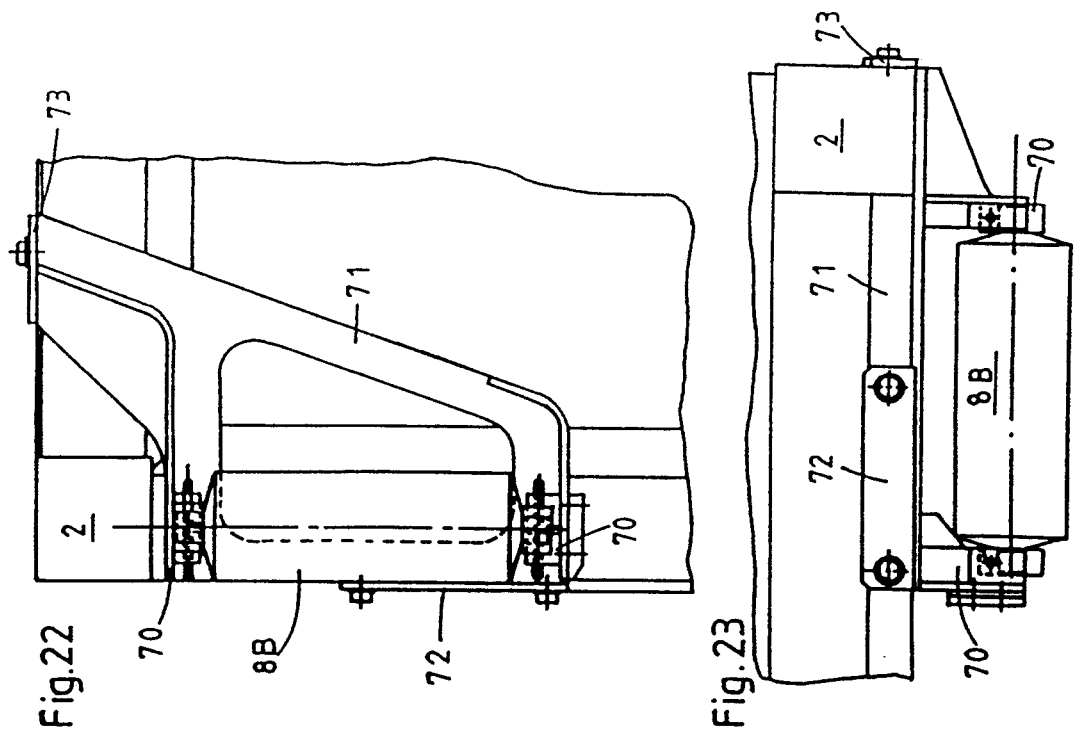

STRUCTURE SUCH AS A CONTAINER OR MOBILE SHELTER

BACKGROUND OF THE INVENTION

1. Field of the Invention

The invention concerns a structure, such as a container or a mobile shelter, designed to be loaded onto a vehicle provided with a hydraulic lifting arm type handling mechanism.

2. Description of the Prior Art

These structures are built around a framework whose lower part embodies two longitudinal rails which cross below cross-members and cooperate with guide rollers at the rear of the vehicle chassis. These longitudinal rails are usually connected at the front part of the structure, to uprights, between which a bail bar is provided at a certain height. The lifting arm of the handling mechanism (described for example in French patent 2,109,109) is in the form of a telescopic boom articulated to a subframe which is connected to the chassis of the vehicle. To load a structure the boom is activated and the arm is swung towards the rear of the vehicle, a hook, carried by the free end of the boom engages the bail bar and the arm is then swung towards the front of the vehicle, during which maneuver the front of the structure is lifted and drawn towards the vehicle in an inclined position until its two bottom rails come into contact with the rollers mounted at the rear of the longitudinal rails of the vehicle. The structure's bottom rails then roll on the rollers while the structure continues to move forward, returning to the horizontal position, whereupon the boom is extended. At the end of the maneuver the structure rests on the rollers and is supported at the front by the hook connected to the free end of the lifting arm, the horizontal part of which is accommodated between the rails.

The configuration of the bottom of the structure (cross-members below which the longitudinal rails project) sometimes causes problems, especially if the structure must travel on a roller or rollerball type of the kind installed on aircraft. These types of handling decks can only cooperate with a flat and continuous surface, which means that the structure must be put on a pallet whose lower surface has these characteristics.

SUMMARY OF THE INVENTION

The present invention is directed to reducing or even avoiding these problems.

To this end, the present invention proposes a structure such as a container or a mobile shelter adapted to be loaded onto a vehicle provided with a hydraulic lifting arm type handling mechanism, the container having two longitudinal bottom rails adapted to cooperate with guide rollers at the rear of the vehicle. According to the invention, the rails are rendered mobile between a deployed position in which they are able to cooperate with the guide rollers and a retracted position in which each is withdrawn into a housing in the bottom of the structure.

By retracting the longitudinal rails, the main projections under the structure are eliminated, which is particularly advantageous as the structure can then rest on a larger area and consequently exert a reduced pressure on the surface on which it rests, for example, on a pallet with a flat and continuous bottom. Additionally, the height of the structure is reduced so that, for example, it can be made to comply to a template from which the rails project in the deployed position.

According to preferred features of the invention the structure has a substantially plane undersurface from which the rails project when in the deployed position. The rails and their respective housings are adapted so that in the retracted position a surface of each rail is substantially coplanar with the undersurface of the structure and thereby closes the respective housing, and the structure then has a substantially flat and continuous bottom.

Note that "substantially flat and continuous bottom means a surface adapted to cooperate with handling decks mounted onboard aircraft, and in particular a surface conforming to ISO standard 8323.

With the rails retracted it is, therefore, possible to roll the structure directly over the handling decks and in particular rollerball transfer plates. This represents a saving in weight because it is no longer necessary to use a pallet with a flat and continuous bottom, avoiding the constraints associated with "packaging" the structure on a pallet of this kind.

In a first preferred embodiment of the invention the structure has mounting means for each rail enabling movement in translation in a vertical plane in which the rail moves from the deployed position to the retracted position.

The means for rendering the rails mobile are thus provided in a particularly simple, convenient and economical way.

In an alternative embodiment of the invention the structure has mounting means for each rail enabling movement in rotation about a longitudinal axis about which the rail pivots from the deployed position to the retracted position.

As compared with retraction of the rails by movement in translation parallel to themselves, this solution has the advantage of requiring a housing which in the floor of the structure occupies a space which is shallow in comparison with the height of the rail. Also, if the undersurface of the structure is required to be flat and continuous, it is advantageous not to close the housing by means of the lower surface of the rail because this surface may be deformed due to the heavy loads to which it may be subjected, but instead by a lateral surface which is much less likely to be deformed.

According to other advantageous features of the invention, two removable or retractable rollers for facilitating loading and unloading of the structure on stabilized ground or its transfer to a trailer or a dock are provided at the rear of the structure. At the front of the structure, two removable or retractable shoes are provided, each of which is adapted to cooperate with a longitudinal rail of the chassis of the vehicle which carries the structure to improve locking of the structure in place, in particular with regard to transverse forces.

The explanation of the invention will now continue with the description of a mobile technical shelter in accordance with the invention given hereinafter by was of non-limiting illustrative example with reference to the appended drawings.

BRIEF DESCRIPTION OF THE DRAWINGS

FIGS. 16A and 16B show, in a similar manner to FIGS. 10 and 12, a variant of the shelter which differs, in particular, in the means for pivoting the rails, FIG. 16A being a cross-section taken on the line A—A in FIG. 16B which is a cross-section taken on the line B—B in FIG. 16A.

FIG. 19 is a partial front view of the shelter from FIG. 1 showing one of its shoes;

FIG. 20 is a partial view in cross-section taken on the line XX—XX in FIG. 19 showing the shoe in both the retracted and extended positions;

FIG. 21 is a view similar to FIG. 20 but showing the shoe only in the extended position;

FIG. 21A shows, in a view similar to FIG. 19, a different type of shoe fastened to a first type of vehicle longitudinal rail;

FIG. 21B shows the shoe locked to a second type of longitudinal rail;

FIG. 21C is a plan view detailing the mounting of the shoe to the shelter;

FIGS. 22 and 23 are, respectively, partial bottom and rear views of the shelter from FIG. 1, and show a retractable roller fitted at the rear end of the shelter;

FIGS. 24 and 25 are partial views in cross-section respectively taken on the line XXIV—XXIV in FIG. 25 and on the line XXV—XXV in FIG. 24, showing the cooperation of the shelter and struts shown in FIGS. 4 through 6.

DETAILED DESCRIPTION OF THE PREFERRED EMBODIMENT

Figure 1:
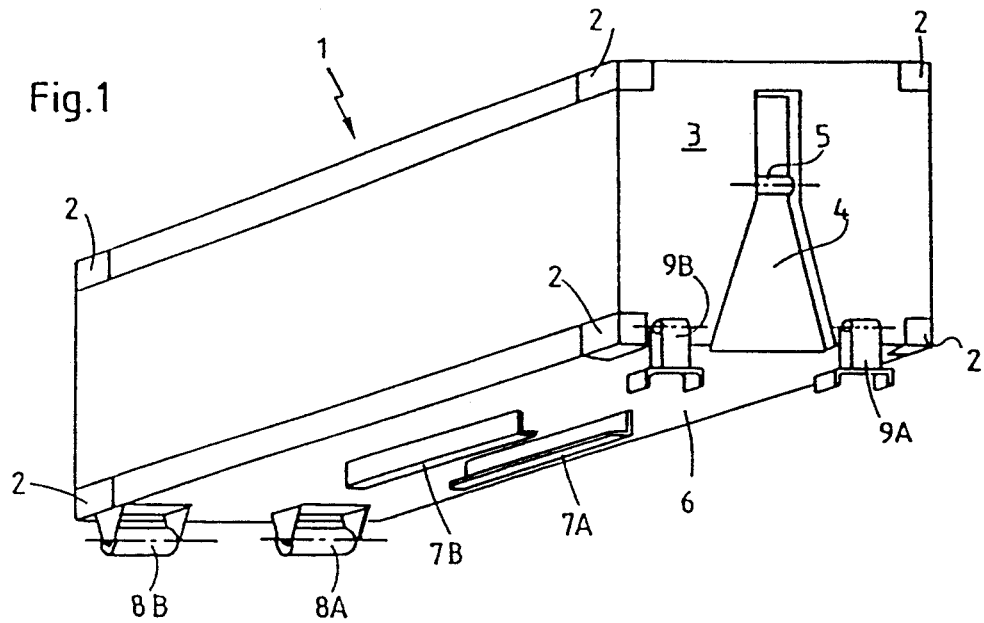
FIG. 1 is a schematic perspective view of the shelter.

A mobile technical shelter 1, shown in FIG. 1, is an ISO standard parallelepiped-shape box and has ISO corner fittings 2. In each of the three outside surfaces of each corner fitting 2 is formed an elongate opening (see FIGS. 24 through 27). The mobile shelter 1 has a front surface 3 incorporating a recess 4 in which is disposed a bail bar 5. The mobile shelter 1 has an undersurface 6 forming a flat bottom which is substantially coplanar with both the bases of each of the bottom corner fittings 2 and with the bottoms of longitudinal rails 7A and 7B. The mobile shelter also has a mechanism (not visible in FIG. 1) for moving the rails 7A and 7B between a deployed or extended position, in which the rails project outward relative to the undersurface 6 (position shown in FIG. 1), and a retracted position in which each rail is positioned in a housing in the bottom of the structure (not shown in FIG. 1). The rails and their respective housings are adapted so that in the retracted position a surface of each rail is substantially coplanar with the undersurface 6 and, therefore, closes the housing so that the shelter has a substantially flat and continuous bottom. Two removable rollers 8A and 8B are additionally provided at the rear end of the shelter's undersurface 6 and at the front two retractable U-shaped shoes 9A and 9B are mounted in line with the rails 7A and 7B.

Figure 2:
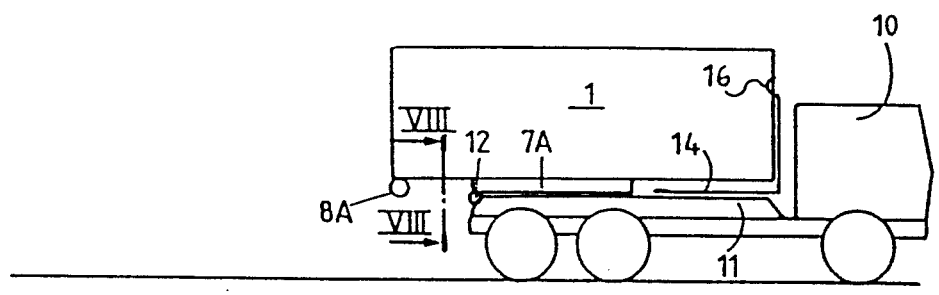
FIGS. 2 through 6 are schematic views in longitudinal cross-section showing the unloading of the shelter from a truck, which has a hydraulic lifting arm type handling mechanism and the reconstitution of a flat and continuous surface on the bottom of the shelter.

FIG. 2 shows the shelter loaded onto a truck 10 whose chassis embodies two longitudinal rails 11 each disposed on one side of a median axis. Mounted on the median axis is a well known type of handling mechanism incorporating a hydraulic lifting arm. As can be seen more clearly in FIGS. 3 through 5, this mechanism includes one or more rollers 12 at the rear end of each longitudinal rail, a subframe 13 mounted transversely to the longitudinal rails, a telescopic boom 14 articulated transversely to the subframe and a pair of hydraulic rams 15 each of which is transversely pivoted at respective ends to one of the longitudinal rails 11 and to the boom 14.

Figure 8:
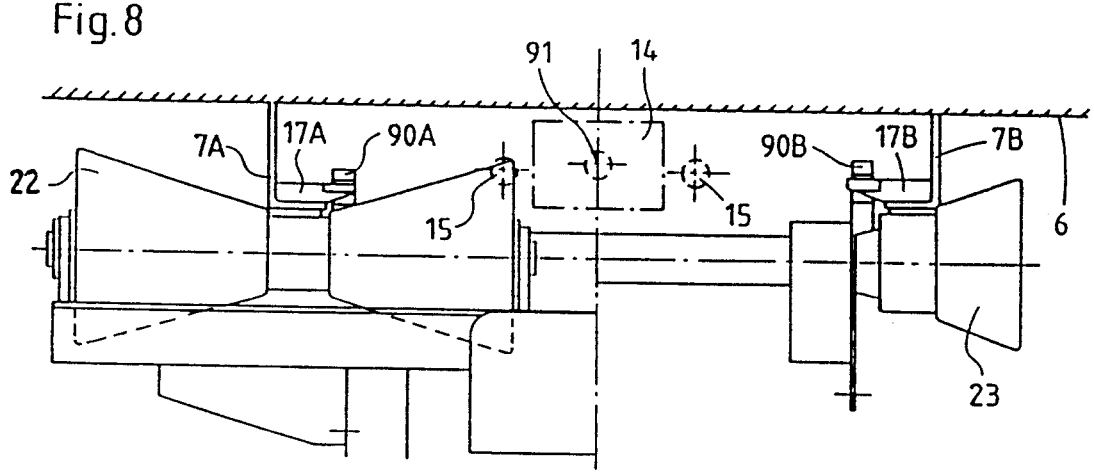
FIG. 8 is a partial view of the cross-section taken on the line VIII—VIII in FIG. 2, the left and right half-sections respectively showing the cooperation of the rails of the shelter with two different types of guide rollers that are currently used.

In the transport position (FIG. 2), the rails 7A and 7B rest on the rollers 12 and the shelter I is supported at the front by a hook 16 at the end of the boom 14 which engages the bail bar 5. The subframe 13 located between the two longitudinal rails 11 of the truck 10 is provided on each side with well-known hooks 90A and 90B (see FIG. 8) whose open sides are oriented transversely and towards the rear and receive a finger 17A and 17B, respectively, attached to the respective rails 7A or 7B (see FIG. 8). The hooks and fingers 17A and 17B make it possible to position the center of gravity of the shelter I at a predetermined position relative to the truck 10 and to maintain this position, especially when strong braking forces are applied. Each longitudinal rail 11 is capped by a U-shaped part of one of the shoe, 9A and 9B so as to secure the shelter 1 to the truck 10, especially when strong lateral forces are exerted, as in turns, for example.

When the shelter 1 is to be unloaded from the truck 10, the shoes 9A and 9B are raised and a piston rod of a ram 91 of the boom 14 is withdrawn to retract the boom and to slide the structure 1 towards the rear of the truck 10. During this movement the fingers 17A and 17B are disengaged from the hooks 90A and 90B, after which the piston rods of the rams 15 are deployed to tilt the lifting arm of the boom 14. The shelter continues to roll backwards on the rollers 12, tilting as it does so until the rollers 8A and 8B come into contact with the ground (see FIGS. 3). The shelter continues to roll on the ground in a tilted position until the boom reaches an abutment on the subframe 13. The subframe 13 then turns about a pivot axis returning the shelter, which by this time has been moved sufficiently clear of the truck 10, to a horizontal position on the ground. When the shelter 1 is resting entirely on the ground (FIG. 4) the hook 16 is disengaged from the bail bar 5 and the truck moves forward slightly and can then drive off after the handling mechanism is returned to its original position (FIG. 5).

Figure 3:
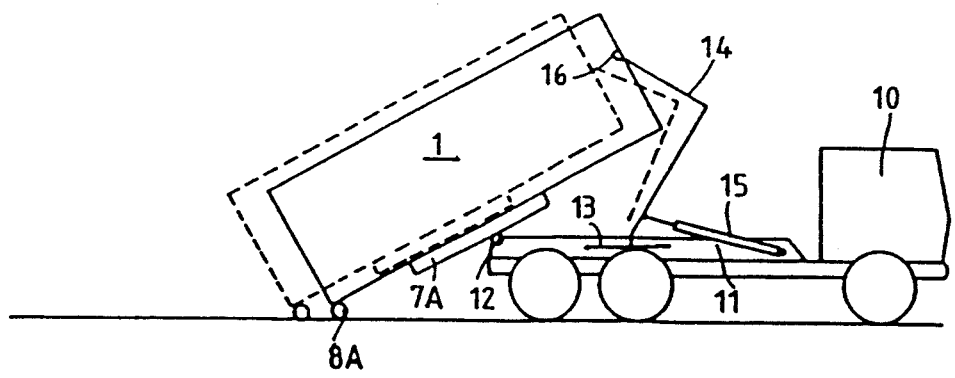
Figure 4:
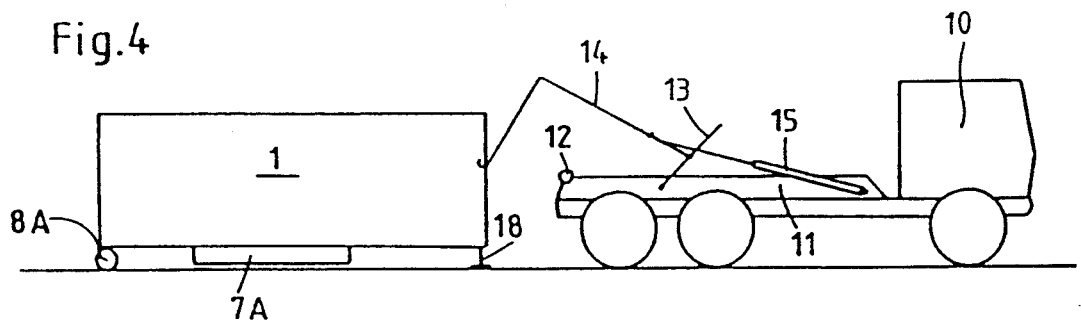

The movement of the handling mechanism is stopped between the positions shown in FIGS. 3 and 4 while struts or feet 18 (described later with reference to FIGS. 24 and 25) are installed into the bottom corner fittings 2 at the front end of the shelter; the feet 18 come into contact with the ground and prevent the rails 7A and 7B from resting on the ground.

Figure 5:
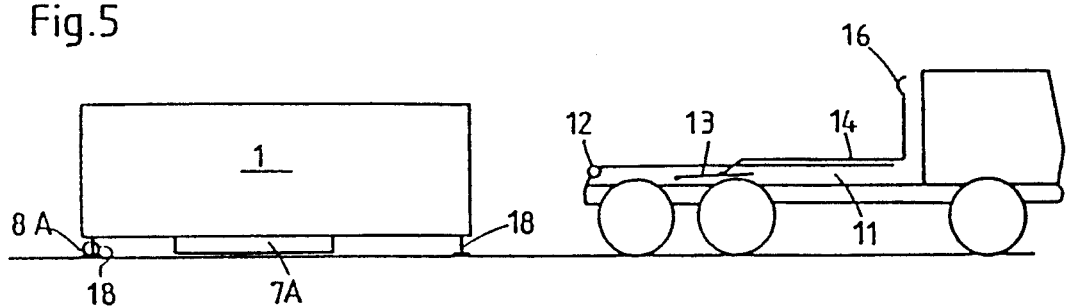
Figure 6:
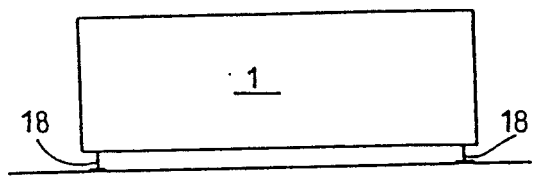
Figure 7:
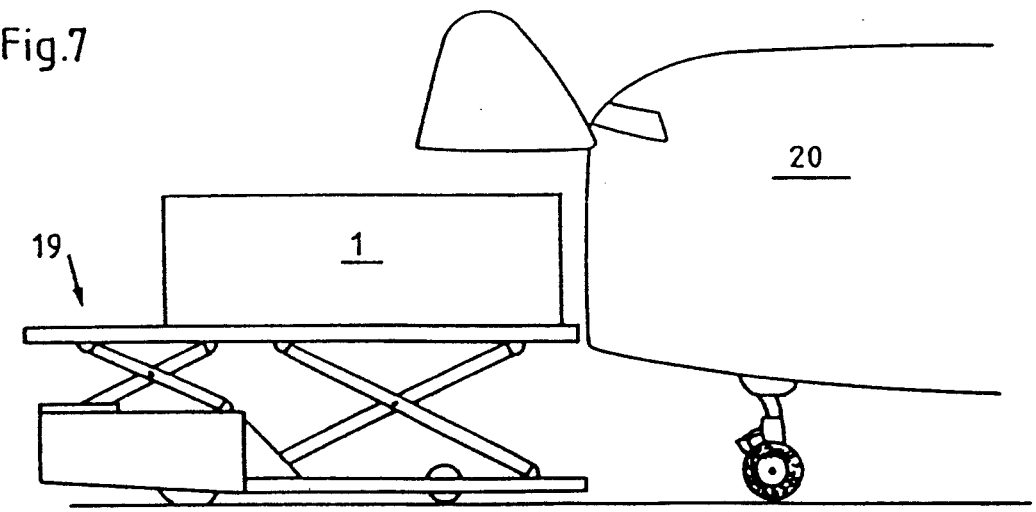
FIG. 7 is a schematic view, in elevation, showing the loading of the shelter into an aircraft.

As can be seen in FIG. 5, after the shelter 1 has been placed on the ground two additional feet 18 are installed in the bottom corner fittings at the rear end of the shelter 1 and are operable to raise the shelter 1 so that it rests only on the feet 18. It is then possible to remove the rear rollers 8A and 8B and to retract the rails 7A and 7B to make the bottom of the shelter flat and continuous (FIG. 6), without sharp projections, protuberances or significant recesses, so that it can travel over a rollerball transfer plate without damaging the transfer plate. The rollerballs on the transfer plate usually have a diameter of 25.4 mm (one inch), and the distance between them is usually 127 mm (five inches).

It is then possible to remove the feet 18 and to load the shelter 1 by conventional means onto a roller system elevator 19 to enable the shelter to be loaded into an aircraft 20 whose floor is fitted with a rollerball type transfer plate enabling the shelter to be moved in any direction while in the aircraft 20 via the tops of the rollerballs.

Note that it is possible to rest the shelter I on the ground on the rails 7A and 7B; that is to say to mount the front feet 18 only after the shelter 1 is put on the ground, but it is more beneficial to prevent contact between the rails 7A and 7B and the ground, as this prevents the rails 7A and 7B from being soiled which could impede their retraction by clogging the housings.

More generally, note that the rails 7A and 7B can be retracted during the unloading process, in which case the front feet 18 are fitted before the shelter 1 is set on the ground and that the shoes 9A and 9B can be left in place until this time and then removed.

Of course, the same operations are carried out in the reverse order to unload the shelter 1 from an aircraft and load it onto a truck.

Given that the loading operation is usually begun with the structure and the vehicle, on which the structure is to be loaded, off-center and misaligned, the rollers 12 at the rear of the handling mechanism must perform a centering function in addition to a rolling function. This centering function is obtained by use of an inclined surface provided on the exterior sides of the rails. In practice a first type of roller (see left-hand half-section in FIG. 8) is in the form of a horizontal axis "disbolo" 22 providing the rolling and centering functions; in a second type of roller (see right-hand half-section in FIG. 8) a horizontal axis roller 23 is used with a cylindrical surface on the inside and a conical surface on the outside.

The shelter schematically shown in FIGS. 1 through 7 will now be described in more detail.

Note that the rails 7A and 7B are very different from the longitudinal rails of conventional structures because they do not constitute any part of the framework of the shelter and because their length is much less than that of the shelter (one third of the latter in this example).

Figure 9:
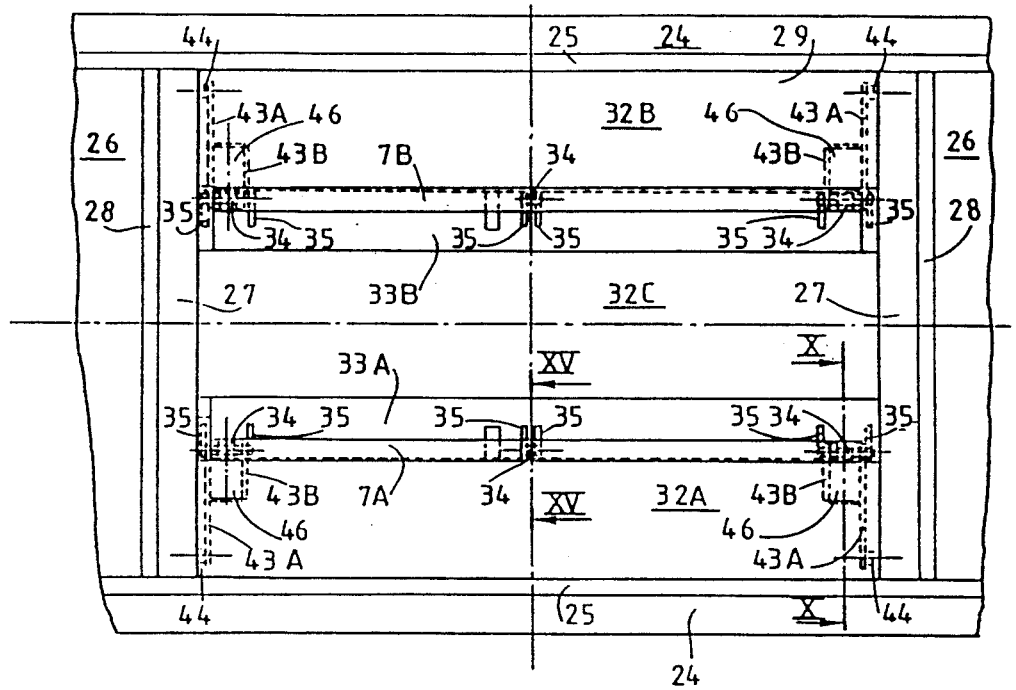
FIG. 9 is a simplified partial bottom view of the shelter from FIG. 1.

The framework of the lower part of the shelter 1 (see FIG. 9) has on each side an outer longitudinal rail 24 of relatively large cross-sectional area. Attached to the outer longitudinal rail 24 is an inner longitudinal rail 25 of relatively smaller cross-section area. Two plates 26 are disposed between the inner longitudinal rails 25, and are welded to them and to the remainder of the shelter framework (not visible in FIG. 9). The bottom surfaces of both the outer and inner longitudinal rails 24 and 25 and the plates 26 are flush. A hollow rectangular space for the rails 7A and 7B is delimited by the inner longitudinal rails 25 and by the crossmembers 27 which are similar in cross-section to the longitudinal rails 24. Outside the crossmembers 27 are crossmembers 28 which are similar to the inner longitudinal rails 25. The lower surfaces of the crossmembers 27 and 28 are flush with the lower surfaces of the longitudinal rails 24 and 25 and the plates 26.

Figure 13:
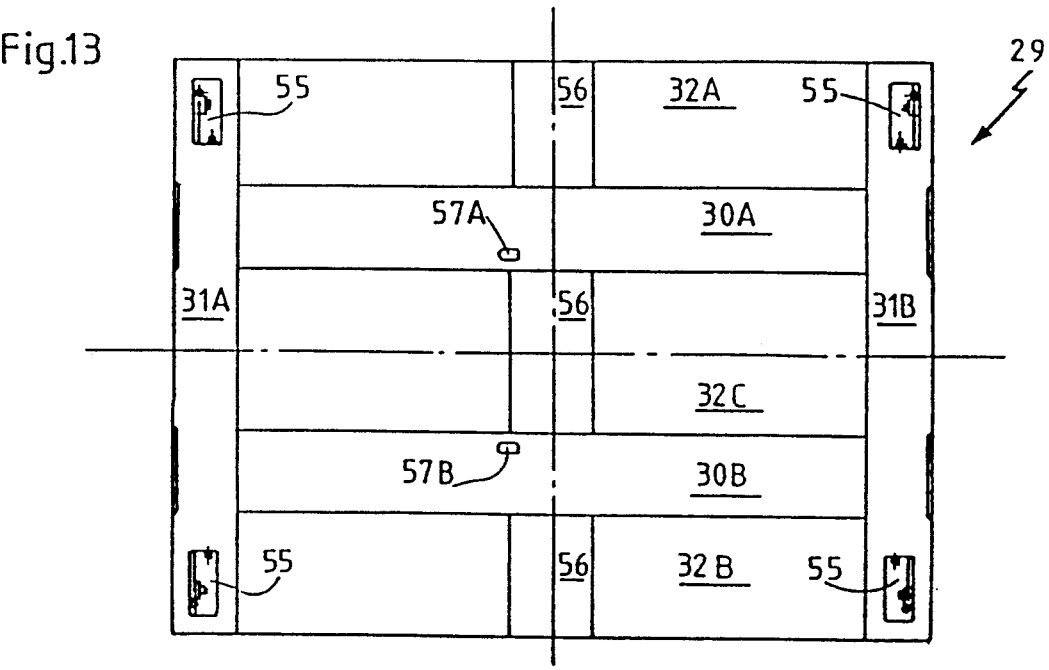
FIG. 13 is a top view of an assembly, integrated into the shelter of FIG. 1, combining the rails, their housings and the means whereby the rails are movable between the deployed position and the retracted position.

An assembly 29, seen in plan view in FIG. 13, is disposed in the hollow rectangular space defined above. The assembly 29 is welded at its edges to the frame formed by the crossmembers 27 and 28 and the longitudinal rails 25 and 27. The assembly 29 embodies the rails 7A and 7B, their housings and the means which the rails 7A and 7B are moved between the deployed and retracted positions. The assembly 29 has two U-shaped longitudinal sections 30A and 30B whose interiors, respectively, form the housings for the rails 7A and 7B; two U-shaped end sections 31A and 31B accommodating the means for operating and locking the rails 7A and 7B; and three bottom plates 32A, 32B and 32C the same length as the assembly 29 and to which the sections 30A, 30B, 31A and 31B are welded. The bottom surfaces of the plates 32A, 32B and 32C are flush with the remainder of the bottom of the shelter 1 which forms a flat and continuous surface except for openings 33A and 33B in the assembly 29.

Figure 10:
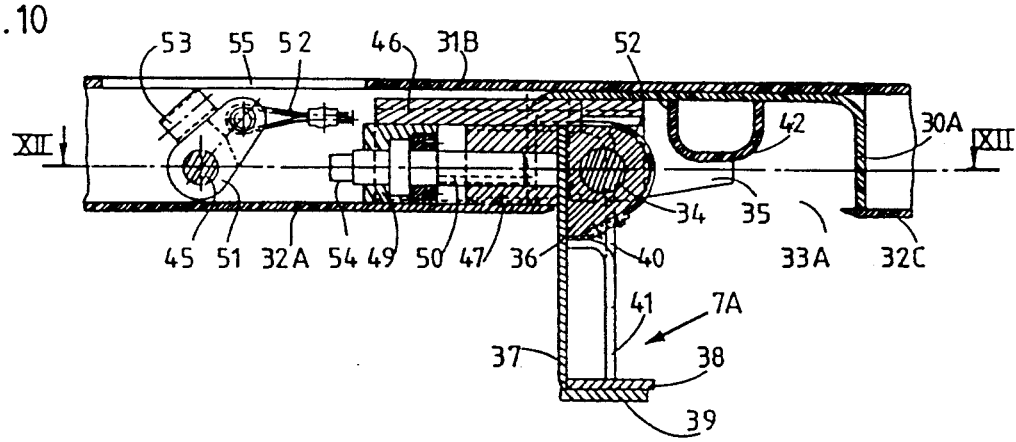
FIG. 10 is a partial view in cross-section taken on the line X—X in FIG. 9 or the line X—X in FIG. 12.
Figure 11:
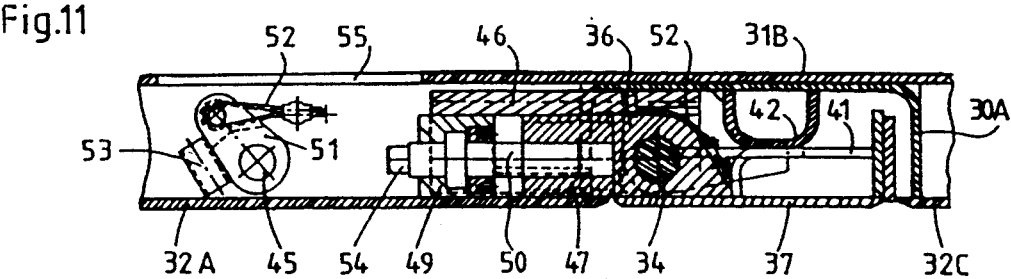
FIG. 11 is a view similar to FIG. 10 with the rail retracted.
Figure 12:
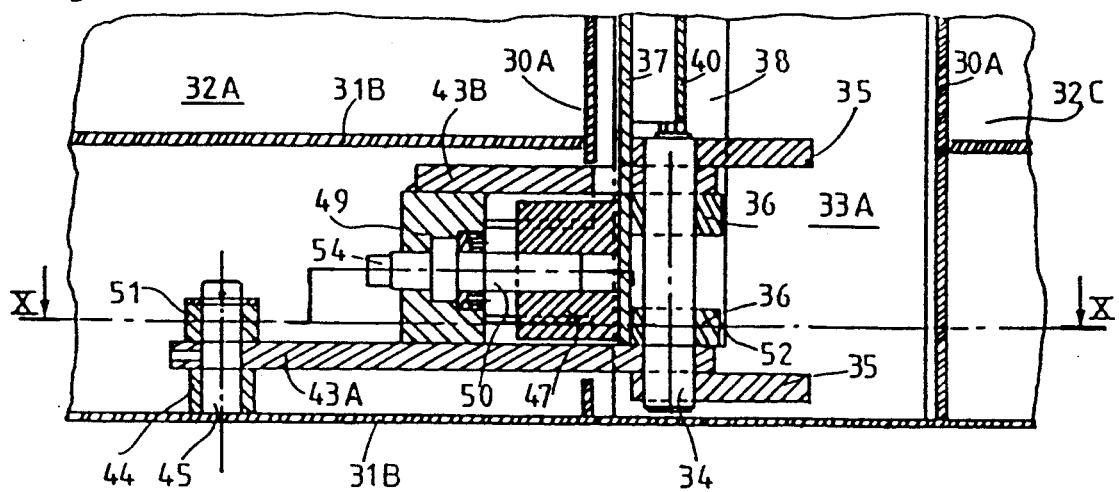
FIG. 12 is a partial view in cross-section taken on the line XII—XII in FIG. 10.

A shaft 34 is carried at each end and at the center of each U-shaped longitudinal section 30A and 30B by pairs of vertical lugs 35 which are welded to a horizontal portion of the U-shaped longitudinal sections 30A and 30B. The shafts 34 of each section 30A and 30B are each aligned along a respective parallel longitudinal (geometrical) axis about which the rails 7A and 7B rotate from the deployed position (FIGS. 9, 10, 12 and 15) to the retracted position (FIGS. 11 and 16).

Each rail 7A and 7B is generally L-shaped with the wider flange formed by a plate 37 and the narrower flange formed by two plates 38 and 39. A relatively smaller L-shaped section 40 joins the plates 38 and 39 with the plate 37 except at the location of lugs 36 where a shorter L-shaped section 41 is used. U-shaped abutments 42 are welded to the upper parts of the U-shaped longitudinal sections 30A and 30B. This provides a means for correctly locating the rails 7A and 7B in the retracted position by coming into contact with the L-shaped section 40 and 41 (see FIGS. 11 and 16) of the rails 7A and 7B. Note that in the retracted position the plates 37 completely close the openings 33A and 33B completely, and in this position are continuous with the plates 32A, 32B and 32C. A bevel or a rounded surface is provided at the facing edges of the plates to avoid any sharp edge likely to damage a rollerball transfer plate over which the shelter travels.

At each end of the assembly 29 the shafts 34 are also carried by pairs of vertical plates 43A and 43B which are welded to the plates 32A (rail 7A) and 32B (rail 7B). The outer plate 43A extends away from the shaft 34 and has a ring 44 welded to the end section 31A and 31B, and a shaft 45 parallel to the shaft 34 is disposed in the ring 44. A plate 46 is welded over the plate 43B and part of the plate 43A facing it so that a square or rectangular cross-section passage is delimited by the plate 32A or 32B, the plates 43A and 43B and the plate 46. Inside this passage is a is shoe 47 in the form of a nut whose cross-section matches that of the passage. A bracket 49 for rotatably mounting and axially retaining a screw 50 is welded to an outer end of the passage opposite the shaft 34. A lever 51 mounted on the shaft 45 is connected by a cable 52 to one of the lugs 36, a short tube 53 is welded to the lever 51 and is adapted to receive a rod (not shown) which is used to turn the lever 51.

Figure 14:
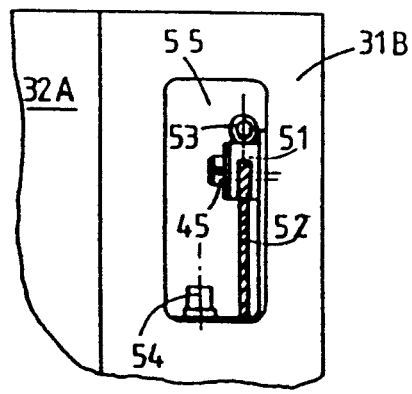
FIG. 14 is an enlarged view of the top right-hand corner FIG. 13.

To retract or deploy the rails 7A and 7B the lever 51 and the prism-shaped end 54 of the screw 50 are accessed via an opening 55 (FIGS. 13 and 14) provided in the top of the U-shaped sections 31A and 31B by an operator inside the shelter 1. Each rail is retracted by applying a wrench to the end 54 of each screw 50 to turn it to retract the shoe 47. When the two shoes are retracted a rod is inserted into the tube 53 to turn the lever 51, the cable 52 then pulling on the rails to pivot them towards the retracted position, after which the screws 50 are turned in the opposite direction until the shoes 47 bear hard against the lugs 36 to lock the rails into the retracted position (FIG. 11). To deploy the rails the levers 51 are turned which loosens the cables 52. The screws 50 are turned to retract the shoes 47 sufficiently. The rails are then deployed under their own weight and the screws 50 are turned in the opposite direction until the shoes 47 bear hard against the plate 37 to lock the rail in the deployed position (FIG. 10).

Figure 15:
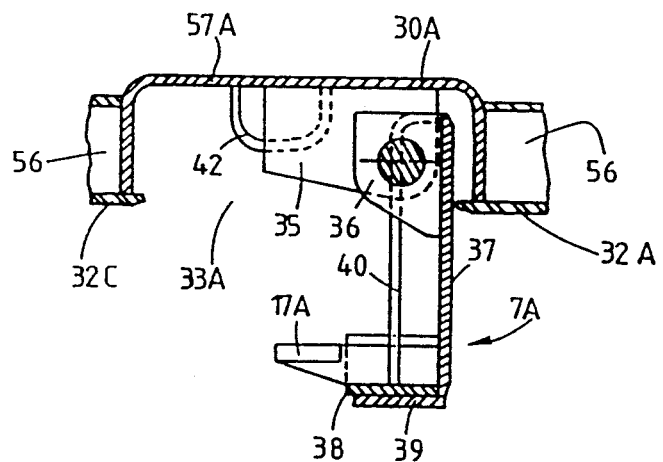
FIG. 15 is a partial view in cross-section taken on the line XV—XV in FIG. 9.
Figure 16:
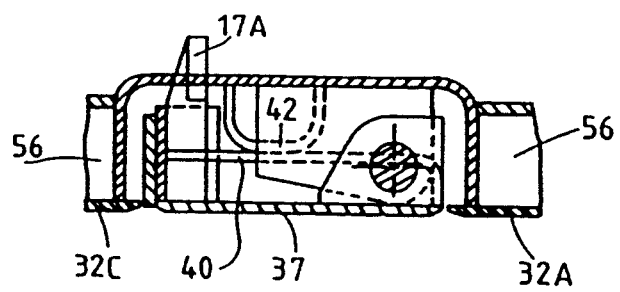
FIG. 16 is a similar view to FIG. 15, with the rail retracted.

As seen in FIGS. 13, 15 and 16, the assembly 29 also includes three U-shaped sections 56 disposed transversely in the middle of the assembly to provide strength. The strengthening sections are welded to the plates 32A, 32B and 32C and to the U-shaped longitudinal sections 30A and 30B. At the positions of the fingers 17A and 17B the top of each U-shaped longitudinal section 30A and 30B is formed with openings 57A and 57B through which the fingers 17A and 17B, respectively, pass when the rail is in the retracted position (see FIG. 16). Note that when deploying the rails if they do not drop spontaneously the operation can be assisted by appropriate action on the end of the fingers projecting above the openings 57A and 57B.

In a variant of the invention shown in FIGS. 16A and 16B, the lever 51 and the shaft 45 are replaced with a screwthreaded tube 100 welded to the plate 43A and a screw 101 which cooperates with the tube 100 and with the cable 52. In this variant, the maneuver to retract or deploy the rails is similar to before, except that the screw 101 is turned instead of the lever 51 being activated. Extender tubes 102 and 103 are provided for turning the screws 50 and 101. They are engaged, respectively, over the prism-shaped end 54 of the screw 50 and over a prism-shaped end 104 of the screw 101. The other end of each extension tube 102 and 103 is accessible by an operator on the outside of the shelter. Note that the opening 55, which is no longer of any utility, is eliminated and that the fingers 17A and 17B and the lugs 35 are bolted instead of welded.

Figure 16C:
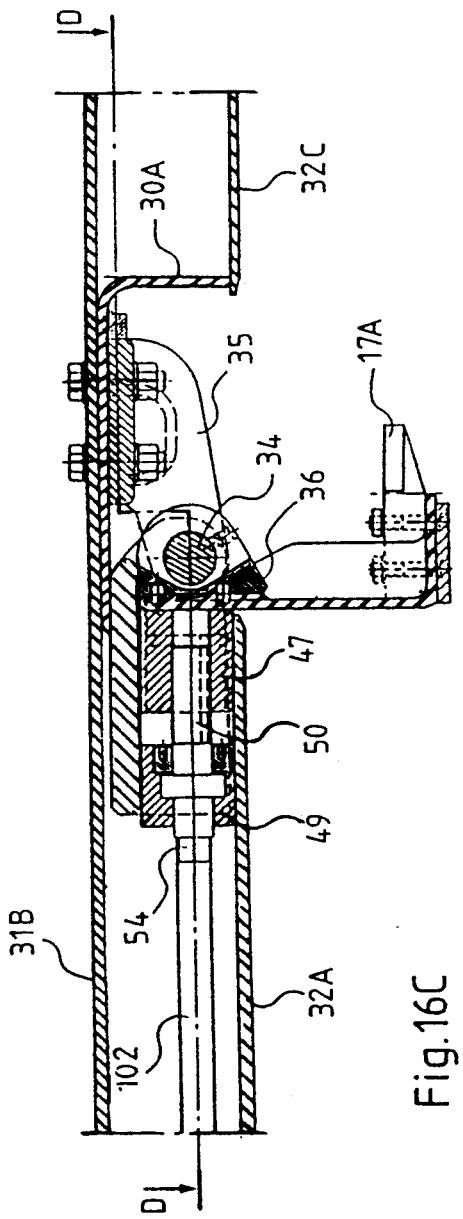
FIGS. 16C and 16D similarly show another variant with yet other means for pivoting the rails, FIG. 16C being a cross-section taken on the line C—C in FIG. 16D which is a cross-section on the line D—D in FIG. 16C.
Figure 16D:
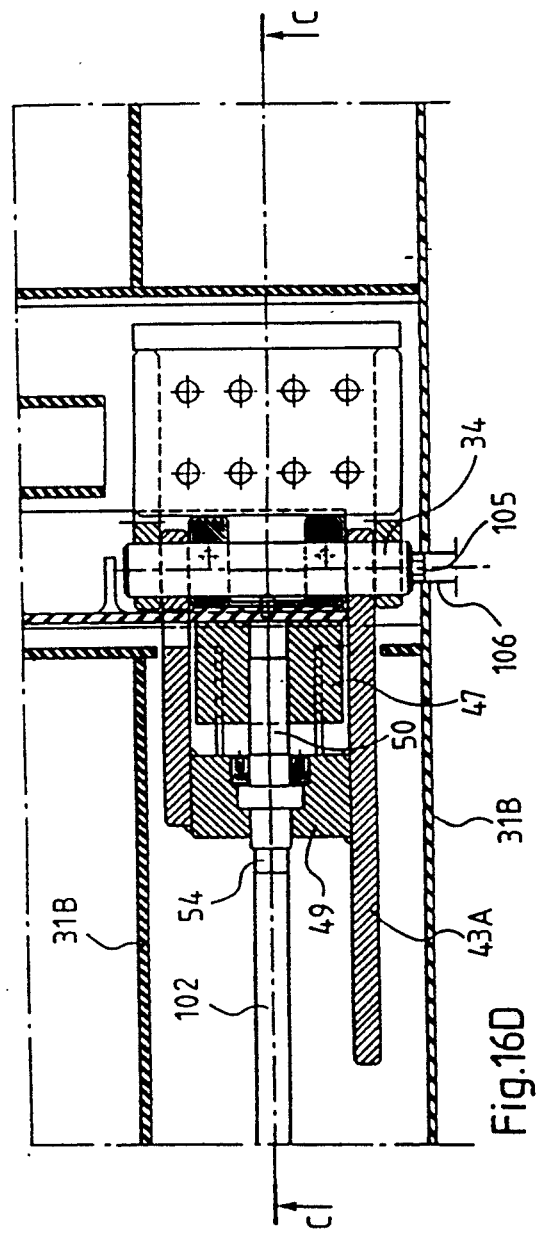

The variant shown in FIGS. 16C and 16D is similar to that which has just been described with reference to FIGS. 16A and 16B but there is no longer any cable 52. Instead, a prism-shaped head 105 is provided on the shaft 34, an extension tube 106 being engaged over the head and extending to one side of the shelter. Note that in this variant the rail can swing to the deployed position not only under its own weight but also because of a torque transmitted by the tube 106.

In other variants (not shown) in which the lever 51 is eliminated, the operator acts directly by pulling on the two cables 52 which can be replaced by a single cable or strap at the middle of the rail.

Figure 17:
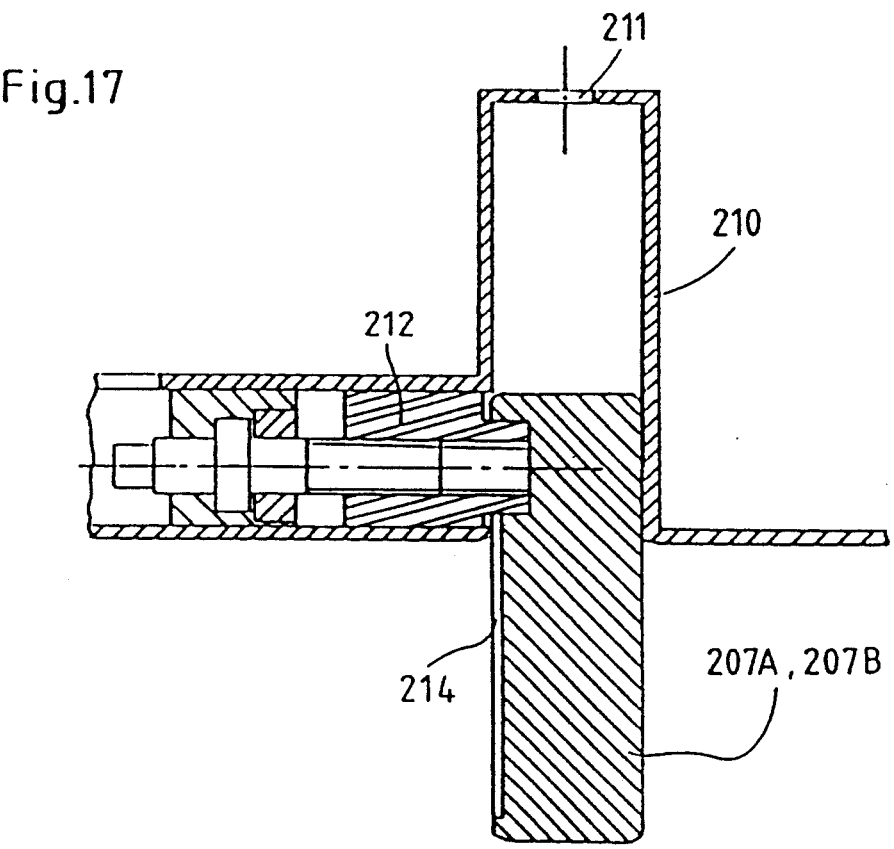
FIGS. 17 and 18 show another variant of the mechanism for moving the rails.
Figure 18:
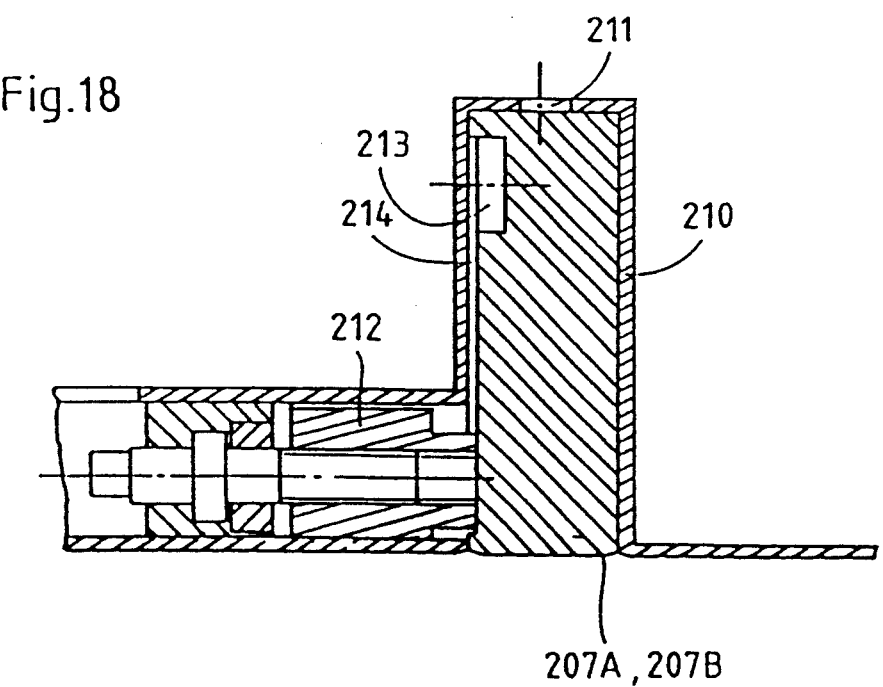

There will now be described with reference to FIGS. 17 and 18 a variant of the means for moving the rails between the deployed and retracted position in which the rails 207A and 207B translate in a vertical plane from the deployed position (FIG. 17) to the retracted position (FIG. 18).

Each rail 207A and 207B is mounted in a slideway 210 which is integrated into the bottom of the shelter 1. To be more precise, the slideway 210 acts as a rail housing. An opening 211 is provided at the top of the slideway 210 for inserting a round shank (not shown) of a jack type lifting rail (also not shown). The end of the round shank has an oval is transverse finger which is inserted into an opening (not shown) of similar cross section in the rail 207A and 207B so that the shank is locked to the rail after it is turned through about a quarter-turn. The lifting rail is used to raise the rail from inside the structure.

A shoe 212 is provided to immobilize and guide the rail and is movable transversely to the rail 207A and 207B by a drive mechanism of the same type as that for the shoe 47 (see FIGS. 10 and 11). The shoe bears against the rail to lock it into each of the deployed and retracted positions. The rails 207A and 207B each have an opening 213 into which the shoe 212 is inserted when the rails are in the deployed position (FIG. 17); and a groove 214 in which the end of the shoe 212 slides when each rail moves. Each end of each groove 214 forms an abutment for the shoe, one in the deployed position and one in the retracted position.

Adjustable abutments (not shown) are used to provide for more accurate positioning of the rails 207A and 207B in the retracted position.

Of course, depending on circumstances, it is totally feasible to provide different means for integrating the rails and for rendering them mobile relative to a structure like the shelter 1. In particular, provisions may be made for the movement of the rails to be motorized rather than manual and to be synchronized rather than independent.

As can be seen in FIG. 19, each front shoe 9B (or 9A not shown) has a U-shaped bottom part designed to engage the longitudinal rail 11 by its upper and inside surfaces or a longitudinal rail 58 of a trailer onto which the shelter or the structure is loaded by its upper and outside surfaces.

Each of the shoes 9A and 9B is formed by a plate 59 which at one end has two lugs 60 fastened to a shaft 61 supported by vertical bearings 61A welded above a front bottom cross-member 62 of the shelter 1. The U-shaped part of the shoe is fastened to an internally screwthreaded sleeve 63 and guided between vertical plates 64 which are welded to the plate 59. A plate 65 is fastened to the plates 59 and 64 and has a threaded hole in its central part. Screwthreaded ends of a rod 67 cooperate with the screwthreads of the sleeve 63 and the plate 65 which are right-hand and left-hand threads, respectively, so that turning the rod 67 causes the sleeve 63 to slide in the plates 64 so that the U-shaped portion of the shoe 9A or 9B bears against the longitudinal rail (11, for example) of the vehicle 10 and the plate 65 bears against the cross-member 62, thus, locking the shoe 9A or 9B in position (FIG. 21).

Above the shoe is an extension of the recess 4 in which the shoe 9A or 9B is housed when in the retracted position (Bee FIG. 20). Holes 68 and 69 are provided in one of the lugs 60 and one of the vertical bearings 61A, respectively, and are aligned with each other when the shoe is in the raised position. A pin is then inserted in the holes 68 and 69 thereby locking the shoe 9A and 9B in the retracted position.

In the embodiment shown in FIGS. 21A, 21B and 21C the U-shaped part of the shoes 9A and 9B is replaced with a holding assembly 110 which is removable rather than permanently fixed, and has a recess to accommodate the shoe in the raised position. In this example, the front surface of the shelter includes, at the bottom on each side, a series of three, side-by-side parallelepiped-shaped recesses 111A, 111B and 111C and a shaft 112 which is fixed into the middle recess 111B. The holding assembly 110 includes a plate 113 which is fixed by means of the recesses 111A, 111B and 111C and the shaft 12; a vertical rod 114, which cooperates, via a screwthread, with the plate 113; a baseplate 115, pivoted to the lower end of the rod 114; a screw 116 which cooperates with the baseplate 115; and an angle-bracket 117 which turns about the end of the screw 116.

The plate 113 has two circular fixing pins 118A and 118B, the outside diameter of which matches the height of the recesses 111A and 111C, the distance between which matches the distance between the fixing pins 118A and 118B also matches the distance between the recesses 111A and 111C so that the only degree of freedom remaining when the pins 118A and 118B are respectively inserted in the recesses 111A and 111C is movement in translation along the length pin axis. To complete the locking to the shelter in this variant, the plate 113 also includes a hook 119 which is engaged on the shaft 112 and locked by tightening a nut 120 at the end opposite the curved end (see FIG. 21C in particular). To cooperate with the rod 115 the plate 113 includes two screwthreaded bores 121A and 121B, either of which may be used, as appropriate.

The rod 114 has a prism-shaped head 122 for turning it, a screwthreaded part 123 which cooperates with either of the bores 121A or 121B, and, at the opposite end, a pivotable mount provided with a smooth hole for the baseplate 115. A nut 124 for the screw 116 is welded on coaxially with the smooth hole of the rod 114.

When the shelter is transported on a vehicle with longitudinal rails 11 (FIG. 21A), the rod 114 is inserted in a bore 121A, the baseplate 115 is arranged with the screw 116 on the inside, and the upper end of the angle-bracket 117 is applied against the lower surface of the horizontal part of the longitudinal rail 11.

When the shelter is transported on a vehicle with longitudinal rails 58, in particular a trailer (see FIG. 21B), the rod 114 is inserted in the bore 121B, the baseplate 115 is arranged with the screw 116 on the outside, and the end of the horizontal part of the angle-bracket 117 bears on the bottom of the longitudinal rail 58.

Note that the screw 116 of each holding assembly 110 locks the shelter laterally and that the clamping of the longitudinal rail between the baseplate 115 and the angle-bracket 117 secures it vertically.

This vertical attachment is advantageous because it prevents impacts during transportation which could be sufficiently intense to deform the bottom of the shelter, compromising its ability to roll directly on an aircraft type rollerball floor.

Finally, note that the longitudinal rail securing device just described with reference to FIGS. 21A, 21B and 21C can be used on structures of different types and, in particular, without rails which are movable between a deployed position and a retracted position.

The removable rear roller 8B and the means for mounting it will now be described with reference to FIGS. 22 and 23. The roller 8A is analogous.

The roller is mounted to rotate on vertical lugs 70 which are attached with reinforcing ribs to a horizontal flat fork 71 which carries two vertical flanges 72 and 73 respectively screwed to the rear and side surfaces of the shelter 1 at the bottom and beyond the corner fitting 2 which is left exposed. This position has the advantage that the corner fitting 2 is still available, in particular for installing the feet 18.

FIGS. 24 and 25 show one example of a foot 18 that can be installed in the corner fitting 2 by means of a conventional system of elongate cams 74 and 75, which are turned 90 relative to each other, and lock the foot 18 to the corner fitting 2. The foot 18 is essentially a jack with a circular pad 77 which is mounted at the end of a rod 78 of a demultiplier mechanism 79. The demultiplier mechanism 79 is operated with a crank-handle which turns about an axis 80.

Figure 26:
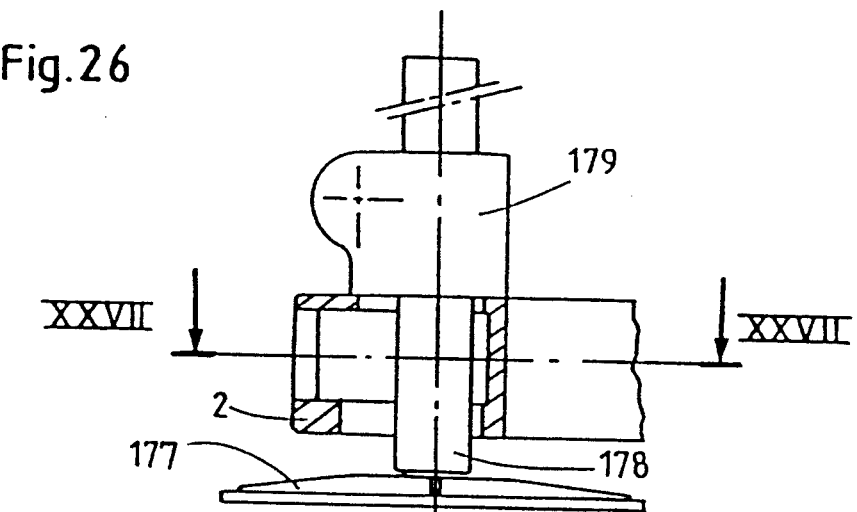
FIGS. 26 and 27 are views similar to FIGS. 24 and 25 showing a variant embodiment and positioning of the struts.
Figure 27:
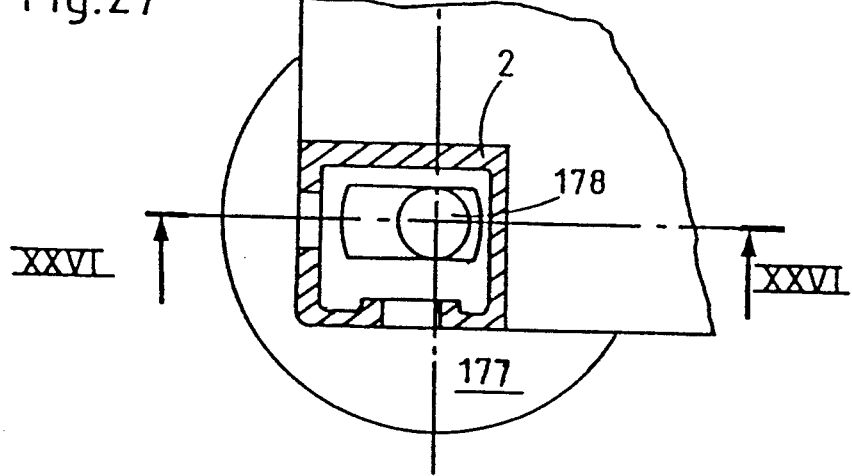

In a variant of the foot 18 shown in FIGS. 26 and 27, the demultiplier mechanism 179 is permanently installed over the corner fitting 2 in a recess provided for this purpose and the rod 178 passes through openings in the corner fitting 2. The pad 177 as simply inserted into the end of the rod 178 which can be raised sufficiently to expose the bottom opening and the interior of the corner fitting 2.

Preferably, provisions are made inside the shelter for stowing the rear rollers 8A and 8B and the feet 18 regardless of which variant of feet 18 is used.

Naturally, depending on circumstances, removable rather than retractable front shoes or retractable rather than removable rollers may be utilized. For example, the rollers described in French Patent 2,358,352 may be used and provided with covers for closing the openings of the roller housing.

Furthermore, note that the features of the invention may be implemented in structures designed to be loaded onto a vehicle provided with a lifting arm type handling mechanism which are different from the shelter 1, such as containers, standard IATA and ATA pallets and mobile packing cases.

More generally, the invention is not limited to the examples described and shown, but to the contrary encompasses all variants that may suggest themselves to a person skilled in the art.

What is claimed is:

1. A structure adapted to be loaded onto a vehicle having a hydraulic lifting-arm-type handling mechanism, said structure comprising:
   a bottom member having a bottom surface;
   a handling bar positioned with respect to said bottom member;

at least one bottom rail juxtaposed said bottom member of said structure;

a housing connected to said bottom member of said structure, said housing having an open side contiguous with said bottom member, said housing being adapted to receive said at least one bottom rail; and means for moving said at least one bottom rail between a first position whereby said at least one bottom rail extends in a direction away from said bottom surface of said bottom member and a second position whereby said at least one bottom rail forms a substantially planar surface with said bottom surface of said bottom member, said moving means being connected to said at least one bottom rail.

2. A structure according to claim 1 wherein said at least one bottom rail of said structure has a first planar surface; and said housing is adapted so that when said at least one bottom rail is in said second position said first planar surface of said at least one bottom rail is coplanar with said bottom surface of said bottom member of said structure and said at least one bottom rail closes said open side of said housing.

3. A structure according to claim 2 further comprising means for mounting said at least one bottom rail to said structure, said mounting means being attached to said structure.

4. A structure according to claim 2 wherein said housing is a slideway adapted to receive said at least one bottom rail; and said structure further comprises means for locking said at least one bottom rail in position, said locking means being connected to said structure.

5. A structure according to claim 4 wherein said at least one bottom rail has a groove therein, said groove having a first end and an opposite end; said at least one bottom rail having a bore therein located at said first end of said groove; said slideway having a first wall, said first wall of said slideway having a hole therein aligned with said groove in said at least one bottom rail; and said means for locking said at least one bottom rail in position comprises:

a shoe disposed in said hole of said first wall of said slideway, said shoe having a first end and an opposite end, said first end of said shoe being located in said groove of said at least one bottom rail.

6. A structure according to claim 3 wherein said at least one bottom rail has a longitudinal axis, said means for mounting said at least one bottom rail to said structure being connected to said at least one bottom rail, and said means for moving said at least one bottom rail comprises:

means for rotating said at least one bottom rail connected to said at least one bottom rail, said rotating means being operable for rotating said at least one bottom rail between said first position and said second position; and said structure further comprises means for locking said at least one bottom rail in position, said locking means being connected to said structure.

7. A structure according to claim 6 wherein said locking means comprises:

a shoe having a first end and an opposite end, said first end of said shoe being juxtaposed said at least one bottom rail;

a drive mechanism attached to said opposite end of said shoe, said drive mechanism being adapted to move said first end of said shoe linearly into contact with said at least one bottom rail; and a screw member attached to said drive mechanism, said screw member being adapted to communicate with said shoe.

8. A structure according to claim 6 wherein said rotating means comprises:

a lever having a first end and a second end, said second end of said lever being fixed relative to said at least one bottom rail;

a cable having a first end connected to said first end of said lever and a second end connected to said at least one bottom rail; and means for operating said lever.

9. A structure according to claim 6 wherein said rotating means further comprises:

a screw-threaded tube being fixed relative to said at least one bottom rail;

a screw located in said screw-threaded tube, said screw having a first end and a second end; and a cable having a first end and a second end, said first end of said screw being connected to said first end of said cable, said second end of said cable being connected to said at least one bottom rail at a point about said longitudinal axis of said at least one bottom rail.

10. A structure according to claim 7 wherein said rotating means further comprises:

a pivot shaft having a prism-shaped head, said pivot shaft being connected to said at least one bottom rail and adapted for rotating said at least one bottom rail about said pivot shaft, said pivot shaft constituting said longitudinal axis of said at least one bottom rail, said pivot shaft being connected to said housing of said structure;

head extension means connected to said prism-shaped head of said pivot shaft and extending in a direction substantially the same as said longitudinal axis of said at least one bottom rail, said head extension means being adapted to rotate said pivot shaft; and screw extension means connected to said screw and extending in a direction away from said shoe, said screw extension means being adapted to operate said shoe between a first position in which said at least one bottom rail is unlocked and a second position in which said at least one bottom rail is locked in position.

11. A structure according to claim 10 wherein said at least one bottom rail is shorter than said structure.

12. A structure according to claim 5 wherein said at least one bottom rail is shorter than said structure.

13. A structure according to claim 3 wherein said vehicle has a sub-frame assembly, said vehicle comprising a hook connected to said sub-frame assembly of said vehicle; and wherein said at least one bottom rail comprises a transverse locking finger adapted to cooperate with said hook on said sub-frame assembly of said vehicle.

14. A structure according to claim 6 further comprising:

a roller assembly removably attached to said structure, said roller assembly being positioned to extend a predetermined distance from said bottom surface of said bottom member of said structure.

15. A structure according to claim 14 wherein said roller assembly further comprises means for retracting said roller assembly to a position within said structure.

16. A structure according to claim 6 further comprising:

a pad assembly removable attached to said structure, and wherein said roller assembly is positioned to extend a predetermined distance from said bottom surface of said bottom member of said structure.

17. A structure according to claim 16 wherein said pad assembly comprises means for retracting said pad assembly to a position within said structure.

* * * * *

UNITED STATES PATENT AND TRADEMARK OFFICE
CERTIFICATE OF CORRECTION

PATENT NO. : 5,284,266
DATED : February 8, 1994
INVENTOR(S) : Bernard Januel and Michel Ravilly It is certified that error appears in the above-indentified patent and that said Letters Patent is hereby corrected as shown below:

Column 1, line 42, after "type" insert ---- handling deck ----.

Column 2, line 12, after "bottom" insert ---- " ----.

Column 2, line 60, delete "was" insert ---- way ----.

Column 3, line 24, after "corner" insert ---- of ----.

Column 3, line 35, delete "16A." insert ---- 16A; ----.

Column 3, line 40, delete "16C." insert ---- 16C; ----.

Column 4, line 28, delete "with-the" insert ---- with the ----.

Column 4, line 39, delete "15" insert ---- 15, ----.

Column 4, line 43, delete "I" insert ---- 1 ----.

Column 4, line 53, delete "I" insert ---- 1 ----.

Column 4, line 56, delete "shoe," insert ---- shoes ----.

Column 5, line 2, delete "FIGS." insert ---- FIG. ----.

Column 5, line 40, delete "I" insert ---- 1 ----.

Column 5, line 64, delete ""disbolo"" insert ---- "diabolo" ----.

Column 6, line 12, delete "cross-section" insert ---- cross-sectional ----.

UNITED STATES PATENT AND TRADEMARK OFFICE
CERTIFICATE OF CORRECTION

PATENT NO. : 5,284,266
DATED : February 8, 1994
INVENTOR(S) : Bernard Januel and Michel Ravilly It is certified that error appears in the above-indentified patent and that said Letters Patent is hereby corrected as shown below:

Column 6, line 30, delete "27" insert ---- 24 ----.

Column 6, line 31, after "means" insert ---- by ----.

Column 6, line 67, delete ---- completely ----.

Column 7, line 14, delete ---- is ---- second occurrence.

Column 7, line 19, after "36," insert ---- and ----.

Column 8, line 28, delete ---- is ---- first occurrence.

Column 9, line 12, delete "Bee" insert ---- see ----.

Column 9, line 39, after "118B" insert ---- and ----.

Column 9, line 43, after "length" insert ---- of the ----.

UNITED STATES PATENT AND TRADEMARK OFFICE
CERTIFICATE OF CORRECTION

PATENT NO.  : 5,284,266
DATED       : February 8, 1994
INVENTOR(S) : Bernard Januel and Michel Ravilly It is certified that error appears in the above-indentified patent and that said Letters Patent is hereby corrected as shown below:

Column 9, line 48, delete "115" insert ---- 114 ----.

Column 10, line 39, delete "as" insert ---- is ----.

Column 11, line 27, delete "2" insert ---- 3 ----.

Column 12, line 62, delete "removable" insert ---- removably ----.

Signed and Sealed this

Thirteenth Day of December, 1994

Attest:

BRUCE LEHMAN

*Attesting Officer*        *Commissioner of Patents and Trademarks*